Sept. 5, 1961　　　　F. X. McCAWLEY　　　　2,998,642
BONDING OF TITANIUM TO STEEL
Filed Jan. 16, 1958
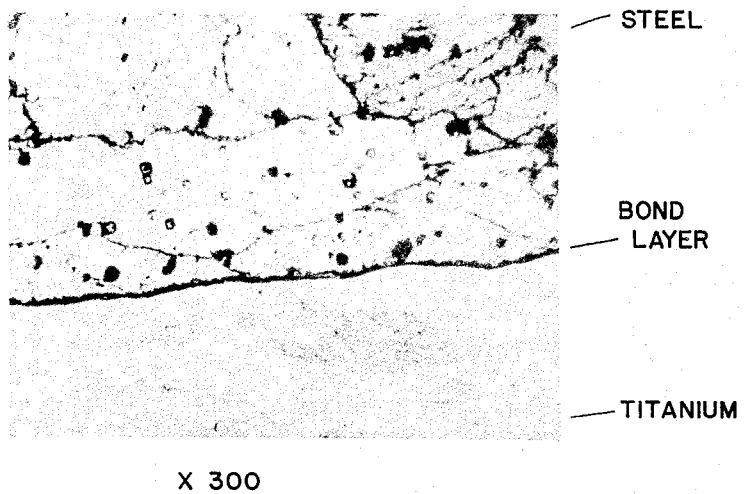
X 300
Frank X. McCawley, Inventor

United States Patent Office 2,998,642
Patented Sept. 5, 1961

2,998,642
BONDING OF TITANIUM TO STEEL
Frank X. McCawley, Cheverly, Md., assignor to Chicago Development Corporation, Riverdale, Md., a corporation of Delaware
Filed Jan. 16, 1958, Ser. No. 709,279
1 Claim. (Cl. 29—194)

This invention relates to the cladding of steel with titanium and titanium alloys. I have found that titanium-aluminum alloys containing about 6–20% aluminum may be pressure welded to steel at temperatures from 750° C.–1000° C. In one embodiment of my invention, I make fabricated alloys of titanium with 6–20% aluminum containing less than .03% oxygen in accordance with copending application of W. W. Gullett, Serial No. 668,770, filed June 28, 1957.

I make a sandwich of the steel to be clad by placing a strip of it, cleaned and polished, between two strips of the titanium-aluminum alloy. I then coat the outer surface of the titanium-aluminum alloy strips with graphite and encapsulate the sandwich in a steel casing welded around its periphery. I now roll this capsule at 900° C. to 50% reduction in area. After cooling, I strip off the outer steel casing and find that the steel between the titanium strips has been tightly and continuously bonded to the titanium on both sides. It may then be further reduced by any rolling technique suitable for titanium; the bond, however, will be embrittled by hot rolling and the assembly will therefore have to be edge-trimmed.

In another example of my invention, I produce the titanium-aluminum alloy in place by placing aluminum foil between the steel and the titanium strip or sheet to be bonded to it. I then encapsulate in steel and hot roll at 750° C.–1000° C. The encapsulating steel is then stripped from the clad steel. The bond produced in this way is tight, continuous and ductile. The clad steel may be bent without breaking the bond.

The depth of the transition zone in the steel and titanium are shown in the photomicrograph of the figure which illustrates the bond layer of my invention. The steel clad with titanium may then be further reduced by rolling under any conditions which will not damage the titanium. By hot rolling, however, the bond will be damaged by oxidation to a limited distance from the edge of the steel so that the clad metal must be trimmed. I have found that the procedure outlined can be used for cladding steel with any hot workable titanium alloy or, conversely, any steel such as stainless steel may be bonded to titanium. My invention therefore encompasses the cladding of titanium or titanium alloys with stainless steel for use in atmospheres or solutions where titanium is attached. It also encompasses the cladding of any type of steel with titanium and titanium alloys.

It will be understood that encapsulation in steel is merely a method of carrying out the pressure welding operation in the absence of air, and when a strip of steel is to be clad on both sides with titanium, or titanium alloy, these outer sheets or strips may be welded around their periphery, and the pressure welding by rolling carried out. The titanium outer surface must then be descaled and cleaned in the usual way. The titanium strip or sheet must be thick enough in this instance, however, to insure that no oxygen penetrates to the aluminum containing bond layer, as titanium-aluminum alloys of this composition are embrittled by oxygen.

*Example I*

I take an ingot of an alloy of titanium 93%, aluminum 7%, with less than .03% oxygen, and roll it at 850° C. in the absence of oxygen to produce a sheet having a thickness of 40 mils. I place this on a clean smooth surface of mild steel having a thickness of 400 mils. I encapsulate this combination in a steel capsule, having coated the outer surface of the titanium sheet with graphite. I roll the encapsulated combination at 900° C. to a reduction of 90%. I then remove the capsule and find that the 40 mil steel sheet is clad with a completely bonded 4 mil laminate of titanium-aluminum alloy.

*Example II*

I take two sheets of pure (less than .03% oxygen) titanium 40 mils thick, and a sheet of mild steel 40 mils thick, all having clean, smooth, flat surfaces. I place a sheet of aluminum foil 1 mil thick between the titanium sheets and the steel. I encapsulate this sandwich in mild steel and weld the periphery. I now roll the capsule at 900° C. to a reduction of 80%. I then remove the steel encapsulating sheets which do not adhere to the titanium. The steel sheet, now 48 mils thick, is coated with completely bonded titanium on both sides. The titanium is 8 mils thick. The bond is highly ductile and the sandwich may be further cold rolled, formed, or worked in any way without breaking the bond. This extreme ductility of the bond is due to the low oxygen content of the titanium used.

*Example III*

I take a sheet of pure titanium containing less than .03% oxygen, and two sheets of stainless steel—type 316. The titanium is .500 inch thick; the stainless steel is 50 mils thick. All sheets are clean, smooth and flat. A 1 mil sheet of aluminum foil is placed on both sides of the titanium and the steel placed over it. The stainless steel is welded around the periphery and the sandwich is rolled at 1000° C. to a reduction of 90%. The outer surfaces are then cleaned and polished. The result is a 50 mil sheet of titanium having bonded on both sides approximately 4 mils of stainless steel (1 mil having been lost in cleaning and polishing). The clad titanium may be further cold rolled or severely formed.

*Example IV*

I proceed as in Example III except that I use commercial titanium sheet. The result is the same except that the bond is less workable and the clad metal cannot be as severely formed as the product of Example III without breaking the bond.

*Example V*

I proceed as in Example III except that I use a pure alloy of titanium and 8% manganese containing less than .03% oxygen. This alloy, while hot workable with about the same case as stainless steel, has a room temperature strength of 200,000 p.s.i. which is not affected by heat treatment. The resulting product is accordingly much stronger than the product of Example III. It is, however, ductile and substantially workable without danger of breaking the bond.

*Example VI*

In this example, I produce a sheet of steel clad with highly pure titanium by the interposition of a thin aluminum sheet in accordance with the procedure of Example II or III. I now weld this laminate to a thick sheet of aluminum, placing the steel side of the laminate against the aluminum and rolling at 630° C. The procedure for this is known in the art.

I draw a tube from the clad aluminum sheet so as to provide an aluminum tube coated with titanium and having only a very thin bonding layer of steel and titanium-aluminum-iron alloy.

In the preceding examples, I have used titanium as the cladding material. In all of the examples I have given, zirconium can be substituted for titanium and the improvement obtained by using pure metal is the same for zirconium as for titanium.

What is claimed is:

A laminated article having a layer of steel, bonded to an alloy consisting of, 6–20% aluminum, less than .03% oxygen balance titanium welded thereto.

References Cited in the file of this patent

UNITED STATES PATENTS

| | | | |
|---|---|---|---|
| 986,654 | Rossi | Mar. 14, | 1911 |
| 1,037,143 | Heintz | Aug. 27, | 1912 |
| 1,155,427 | Liebmann et al. | Oct. 5, | 1915 |
| 1,374,110 | Pittevil | Apr. 5, | 1921 |
| 1,664,741 | Mougey | Oct. 11, | 1927 |
| 1,888,815 | Begtrup | Nov. 22, | 1932 |
| 2,785,451 | Hanink | Mar. 19, | 1957 |
| 2,813,332 | Keay | Nov. 19, | 1957 |